United States Patent
Yonekura et al.

[11] Patent Number: 5,170,677
[45] Date of Patent: Dec. 15, 1992

[54] ELLIPTIC GEAR HAVING A CONSTANT VELOCITY PORTION

[75] Inventors: Kiyoto Yonekura; Takashi Yamamoto, both of Toyota; Atsushi Umemura; Atsushi Mizuta, both of Susono, all of Japan

[73] Assignee: Toyota Jidosha Kabushiki Kaisha, Toyota, Japan

[21] Appl. No.: 791,328

[22] Filed: Nov. 14, 1992

[30] Foreign Application Priority Data

Nov. 14, 1990 [JP] Japan .................. 2-307498

[51] Int. Cl.$^5$ ............................................. F16H 55/17
[52] U.S. Cl. ......................................... 74/437; 74/393; 74/462
[58] Field of Search ................. 74/393, 437, 460, 462

[56] References Cited

U.S. PATENT DOCUMENTS

| 844,210 | 2/1907 | Strickland | 74/437 |
| 3,125,892 | 3/1964 | Schwesinger | 74/437 X |
| 3,178,959 | 4/1965 | Schwesinger | 74/437 |
| 4,036,073 | 7/1977 | Kitano | 74/437 X |

FOREIGN PATENT DOCUMENTS 61-266866 11/1986 Japan .
62-270863 11/1987 Japan .

OTHER PUBLICATIONS

Pesqueria, J. J., "Principles of Design for Non-Circular Gears", Part I, Product Eng., Dec. 1936 pp. 454-457.
Pesqueria, J. J., "Principles of Design for Non-Circular Gears, Part II," Product Engineering, Jan. 1937, pp. 63-65.
Pesqueria, J. J., "Principles of Design for Non-Circular Gears, Part III," Product Engineering, Feb. 1937, pp. 19-22.

Primary Examiner—Leslie A. Braun
Assistant Examiner—David W. Laub
Attorney, Agent, or Firm—Cushman, Darby & Cushman

[57] ABSTRACT

An elliptic gear having a constant velocity portion, wherein a pitch circle is a closed curve composed of: a constant velocity portion pitch curve, in which the radius from the center of rotation is a constant arc; and an inconstant velocity portion pitch curve, which is expressed by a formula of an ellipse in polar coordinates having its pole located at the center of rotation and which merges smoothly into the constant velocity portion pitch curve.

4 Claims, 5 Drawing Sheets

5,170,677

ELLIPTIC GEAR HAVING A CONSTANT VELOCITY PORTION

BACKGROUND OF THE INVENTION

The present invention relates to an elliptic gear or an unequal velocity ratio gear.

If the ratio of angular velocities of two shafts having a constant center distance could be continuously changed by a pair of gears, the torque at the input or output side would change in accordance with the velocity ratio so that the transmission device generally composed of many gears could be replaced by a gear unit having a simpler structure. The unequal velocity ratio gear of this kind, as known, is exemplified by the elliptic gear.

A pitch circle of the elliptic gear is generally expressed in polar coordinates by the following formula:

$$R = \frac{l_n}{1 + e_n \cdot \cos(n \cdot \phi)}$$

Here: R, the radius of the pitch circle of the elliptic gear; $l_n$, one half of the straight chord of a reference ellipse; $e_n$, the eccentricity of the reference ellipse; n, the degree of the ellipse; and $\phi$, the angle of rotation of the elliptic gear.

FIGS. 5A to 5D are contour diagrams showing examples of the elliptic gears which are determined on the basis of the above-specified formula. FIG. 5A illustrates the gear for n=1; FIG. 5B that for n=2; FIG. 5C that for n=3; and FIG. 5D that for n=4.

In the prior art, examples of the gear unit employing the elliptic gear are disclosed in Japanese Patent Laid-Opens Nos. 266866/1986 and 270863/1987.

As could be easily understood from the aforementioned formula and FIGS. 5A to 5D, the elliptic gear has no portion, in which the radius from the center of rotation is constant, so that the rotational angular velocity ratio of two shafts coupled to each other through the paired elliptic gears changes at all times. This changing behavior is explicitly illustrated in the diagrams of angular velocity ratio presented in the above-specified Laid-Opens.

Now, the desire of holding the velocity ratio constant within a predetermined range of rotational angle while achieving an unequal velocity ratio outside that range cannot be obtained by the aforementioned paired elliptic gears only. Therefore, the inventions disclosed in the above-specified Laid-Opens have adopted a plurality of elliptic gears and a mechanism for changing their connecting relations. Thus, according to the constructions, as disclosed, the angular velocity ratio can be constant within the predetermined angular range, but the construction of the system inherently become complicated. On the other hand, the gear unit of the prior art is constructed to effect the equal velocity rotations and the unequal velocity rotations by interchanging the connecting relations of the gears. This construction will cause such a disadvantage and limit the application that the change in the angular velocity ratio, i.e., the acceleration at the instant when the rotational motions change between the equal velocity rotations and the unequal velocity rotations inherently become abrupt.

SUMMARY OF THE INVENTION

An object of the present invention is to provide an elliptic gear, which is constant in an angular velocity ratio within a predetermined angular range and smooth in the change in the angular velocity ratio between a constant velocity portion and an inconstant velocity portion.

Another object of the present invention is to provide an elliptic gear which can change a torque to be transmitted smoothly.

Still another object of the present invention is to provide an elliptic gear which can be easily machined.

According to the present invention, there is provided an elliptic gear having a constant velocity portion, wherein a pitch circle is a closed curve composed of: a constant velocity portion pitch curve, in which the radius from the center of rotation is a constant arc; and an inconstant velocity portion pitch curve, which is expressed by a formula of an ellipse in polar coordinates having its pole located at said center of rotation and which merges smoothly into said constant velocity portion pitch curve.

In the elliptic gear according to the present invention, moreover, the radius of the end portion of said constant velocity pitch curve and the radius of the end portion of said inconstant velocity portion pitch curve from said center of rotation are equal to each other.

In the elliptic gear according to the present invention, still moreover, a tangent line of said constant velocity portion pitch curve at the end portion thereof and a tangent line of said inconstant velocity portion pitch curve at the end portion thereof are aligned with each other.

In the elliptic gear according to the present invention, therefore, the portion drawing the pitch curve having a constant radius provides the constant velocity portion, and the portion drawing the pitch curve expressed by the elliptic formula provides the inconstant velocity portion. The paired gears have their constant velocity portions meshing with each other and their inconstant velocity portions meshing with each other. As a result, the gears have their angular velocity ratio continuously changed, while meshing to rotate at their inconstant velocity portions, and switched to one according to the radius ratio when the meshing engagement passes the inconstant velocity portions to the constant velocity portions. In the present invention, moreover, the sentence "the constant velocity portion pitch curve and the inconstant velocity portion pitch curve smoothly merge into each other" means that the tangent lines (or normal lines) of the individual pitch curves at their end portions are aligned to each other. As a result, the angular velocity ratio of the individual gears gradually approaches that which is determined by the ratio of the radii of the constant velocity portions or, to the contrary, gradually increases or decreases from the constant angular velocity ratio.

The above and further objects and features of the present invention will more appear from the following detailed description when the same is read in connection with the accompanying drawings. It is expressly understood, however, that the drawings are for the purpose of illustration only and are not intended to define the limits of the invention.

DETAILED DESCRIPTION OF THE PREFERRED EMBODIMENT

Figure 1:
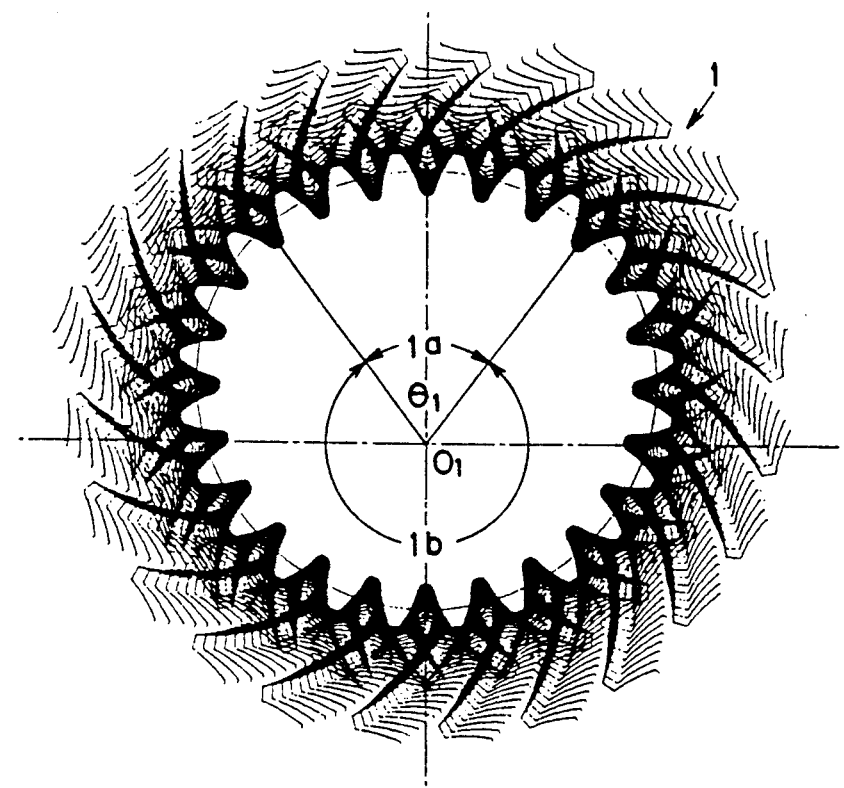
FIG. 1 is a contour diagram showing the shapes of a pair of elliptic gears according to the present invention.
Figure 1:
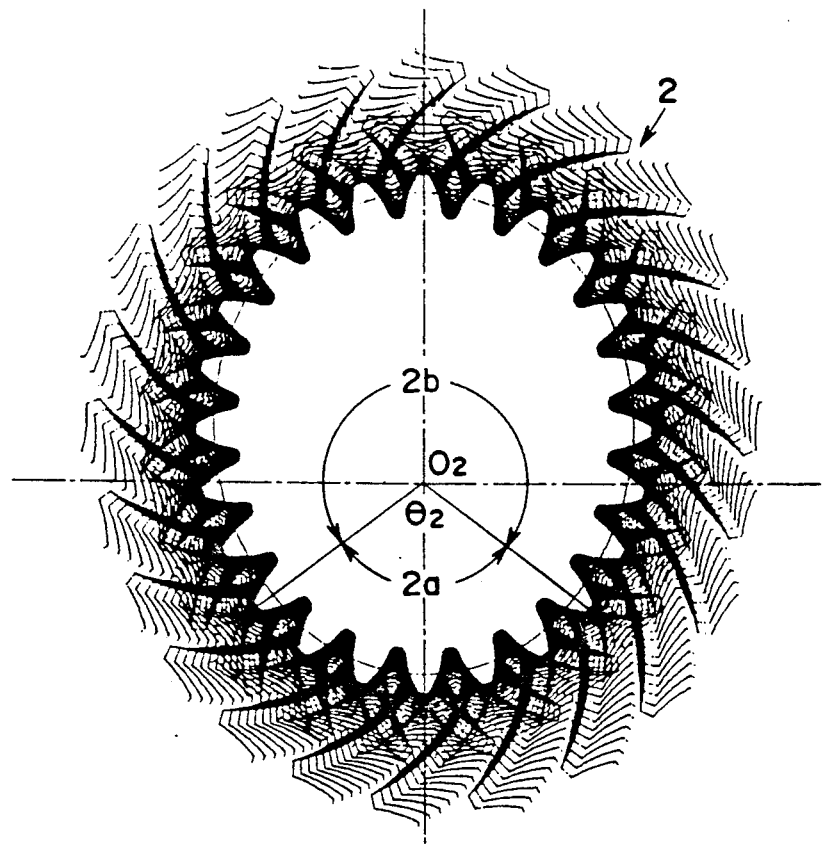

FIG. 1 is a contour diagram showing a pair of gears 1 and 2 according to the present invention. Of these, one gear (as will be tentatively named the "first gear") 1 is composed of: a constant velocity portion 1a which extends in the range of an angle $\theta_1$ with respect to the center of rotation $O_1$; and an inconstant velocity portion which extends in the remaining range. The other gear (as will be tentatively named the "second gear") 2 is composed of: a constant velocity portion 2a which extends in the range of an angle $\theta_2$ with respect to the center of rotation $O_2$; and an inconstant velocity portion which extends in the remaining range. In these gears 1 and 2, the constant velocity portions 1a and 2a and the inconstant velocity portions 1b and 2b merge smoothly into each other, respectively. In these portions, the pitch circle radii, the central angels and the arc lengths are determined to have the following relations.

Figure 2:
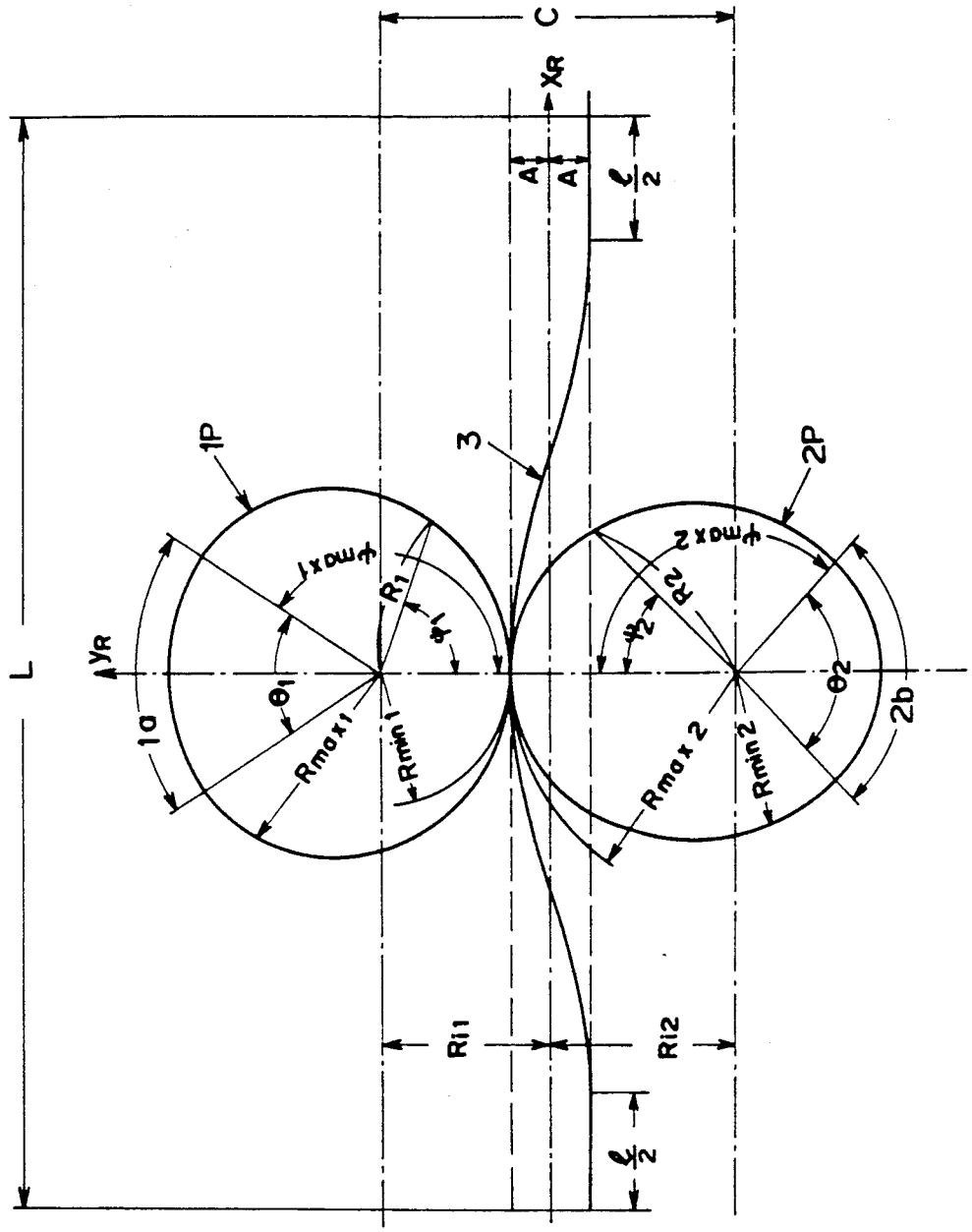
FIG. 2 is an analytic diagram for explaining the shapes of the pitch circles of the individual gears shown in FIG. 1.

FIG. 2 is an analytic diagram for explaining these relations and illustrates the pitch circle 1p of the first gear 1, the pitch circle 2p of the second gear 2, and the pitch line 3 of a rolling contact (or common) rack of those expanded pitch circles.

The rolling contact rack is expressed by the following formulas, wherein:

L: the pitch of the rolling contact rack;

$\underline{l}$: the length of the constant velocity portion of the pitch curve;

A: the one-side amplitude of a cosine curve;

$\omega_R$: the angular velocity of the rolling contact rack;

$X_R$, $Y_R$: the x-y coordinates of the rolling contact rack; and $\phi_R$: the angle of the rolling contact rack.

$$\omega_R = \frac{2 \cdot \pi}{L - \underline{l}} ; \qquad (1)$$

$$\phi_{Rmax} = \frac{L}{L - \underline{l}} \pi; \qquad (2)$$

$$X_R = \frac{\phi_R}{\omega_R}, (0 \leq |\phi_R| \leq \phi_{Rmax}); \qquad (3)$$

and $$\left. \begin{array}{l} y_R = A \cdot \cos\phi_R, (0 \leq |\phi_R| \leq \pi) \\ y_R = -A, (\pi \leq |\phi_R| \leq \phi_{Rmax}) \end{array} \right\} \qquad (4)$$

On the other hand, the pitch circles of the individual gears 1 and 2 are expressed from their ellipticities by the following formula, wherein:

$R_j$: the pitch circle radius of the gear j;

$\phi_j$: the angle of rotation of the gear j;

$\phi_{Rmax}$: the maximum angle of rotation of the elliptic portion of the gear j; and j: a suffix (i.e., 1 for the first gear, and 2 for the second gear).

$$\left. \begin{array}{l} R_j = \dfrac{\underline{l}_{nj}}{1 \pm e_{nj} \cdot \cos(n_j \cdot \phi_j)} \\ \quad (0 \leq |\phi_j| \leq \phi_{maxj}) \\ \quad (+ \text{ for the first gear,} \\ \quad - \text{ for the second gear}) \\ R_1 = R_{max1} \\ R_2 = R_{min2} \\ \quad (\phi_{maxj} < |\phi_j| \leq \pi) \end{array} \right\} \qquad (5)$$

$$\underline{l}_{nj} = \frac{R_{ij}^2 - A^2}{R_{ij}} ; \qquad (6)$$

$$e_{nj} = \frac{A}{R_{ij}} ; \qquad (7)$$

and $$n_j = \omega_R \cdot \sqrt{R_{ij}^2 - A^2} . \qquad (8)$$

In the relations shown in FIG. 2, the conditions for the pitch circles and rolling contact racks of the individual gears 1 and 2 to accomplish the rolling contact with each other are as follows:

Constant Velocity Portion:

$$R_{max1} \cdot \theta_1 = R_{min2} \cdot \theta_2 = \underline{l} \qquad (A);$$

and

Inconstant Velocity Portion:

$$n_1 \cdot \phi_{max1} = n_2 \cdot \phi_{max2} \qquad (B).$$

The gears 1 and 2 shown in FIG. 1 are given the relations expressed by the above-identified formulas so that specific dimensions such as the radii can be determined on the basis of the relations. In this case, the center distance C of the gears 1 and 2, the gear ratio $\epsilon_{min}$ of the constant velocity portions, and the angle $\theta_1$ of the constant velocity portion 1a of the first gear 1 are values which can be set in advance by the design.

Therefore, if the pitch circle radius of the constant velocity portion 1a of the first gear 1 is designated at $R_{max1}$, if the pitch circuit radius of the constant velocity portion 2a of the second gear 2 is designated at $R_{min2}$, and if the angle of the constant velocity portion 2a is designated at $\theta_2$, they can be determined from the following formulas:

$$R_{max1} = \frac{C}{1 + \epsilon_{min}} ; \qquad (9)$$

$$R_{max2} = \frac{\epsilon_{min} \cdot C}{1 + \epsilon_{min}} ; \qquad (10)$$

and $$\theta_2 = \frac{\theta_1}{\epsilon_{min}} . \qquad (11)$$

On the other hand, the maximum angle of rotation $\phi_{maxj}$ of the inconstant velocity portions 1b and 2b can be determined from the following formula:

$$\phi_{maxj} = \pi - \frac{\theta_j}{2}. \quad (12)$$

The foregoing formulas (8) and (12) are reformed, if substituted into the aforementioned formula (B) of the inconstant velocity portion, into the following expression:

$$A = \frac{\phi_{max1}^2 \cdot R_{max1}^2 - \theta_{max2}^2 \cdot R_{min2}^2}{2 \cdot (\theta_{max1}^2 \cdot R_{max1} + \theta_{max2}^2 \cdot R_{min2})}. \quad (13)$$

Moreover, the pitch circle radii $R_{j1}$ and $R_{j2}$ of the gears 1 and 2 to contact with a reference line ($Y_R=0$) of the rolling contact rack can be determined from the following formulas:

$$\left. \begin{array}{l} R_{j1} = R_{max1} - A \\ R_{j2} = R_{min2} + A \end{array} \right] \quad (14)$$

The gears 1 and 2, as shown in FIG. 1, can be obtained by determining their respective pitch curves from the above-specified formulas and by generating their gears according to the pitch curves.

Here, the elliptic portions $l_{nj}$, $e_{nj}$ and $n_j$ can be determined by substituting the formulas (13) and (14) into the formulas (6) to (8).

In the gear 1, therefore, the radius of the constant velocity portion 1a and the maximum diameter of the inconstant velocity portion 1b are equalized to align their tangent lines at their two end or boundary portions. In the gear 2, too, the radius of the constant velocity portion 2a and the minimum radius of the inconstant velocity portion 2b are equalized to align their tangent lines at their two end or boundary portions.

Figure 3:
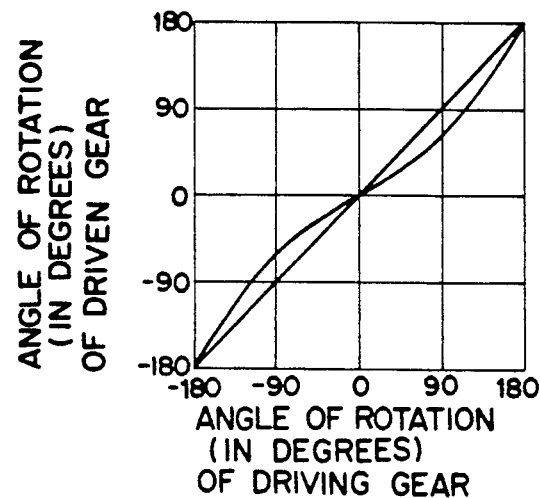
FIG. 3 is a diagram plotting the relations of the angles of rotation of the individual gears shown in FIG. 1.
Figure 4A:
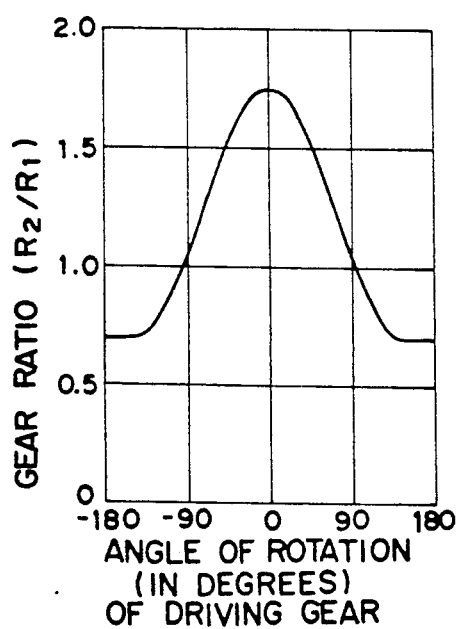
FIGS. 4A and 4B are diagrams plotting the relations between the angles of rotation and the gear ratio of the gears shown in FIG. 1.
Figure 4B:
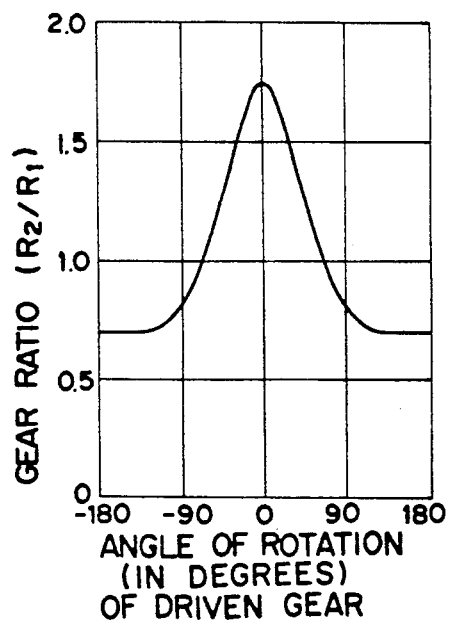
Figure 5A:
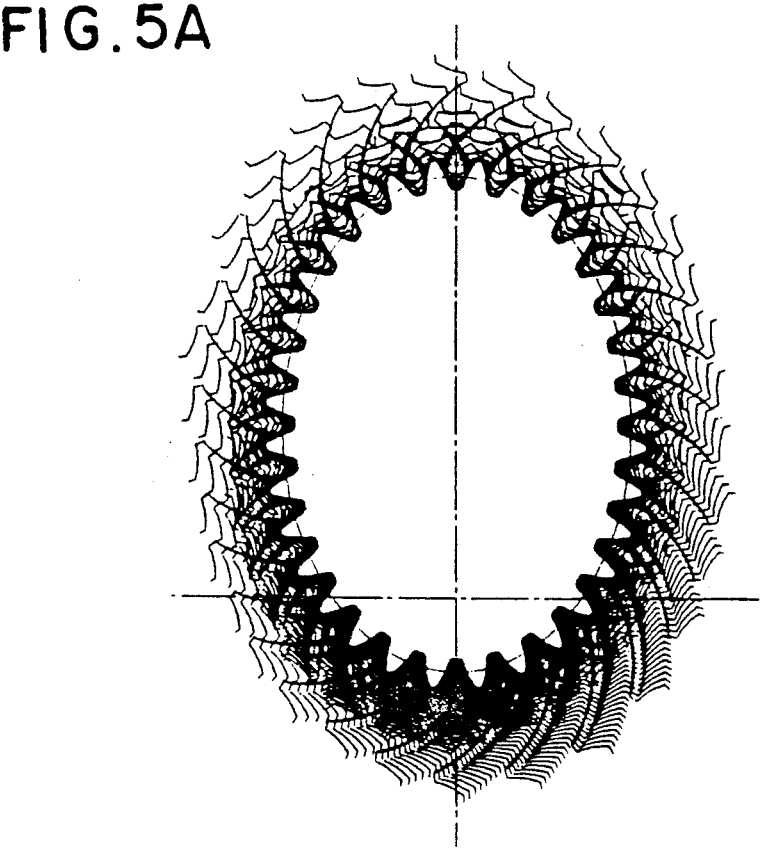
FIGS. 5A to 5D are contour diagrams showing the shapes of the generally existing elliptic gears.
Figure 5B:
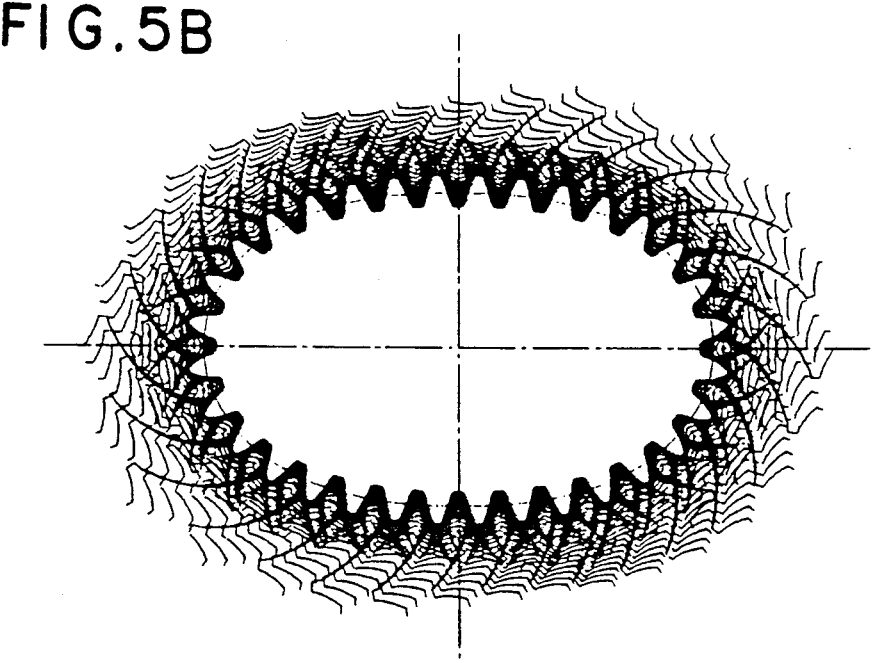
Figure 5C:
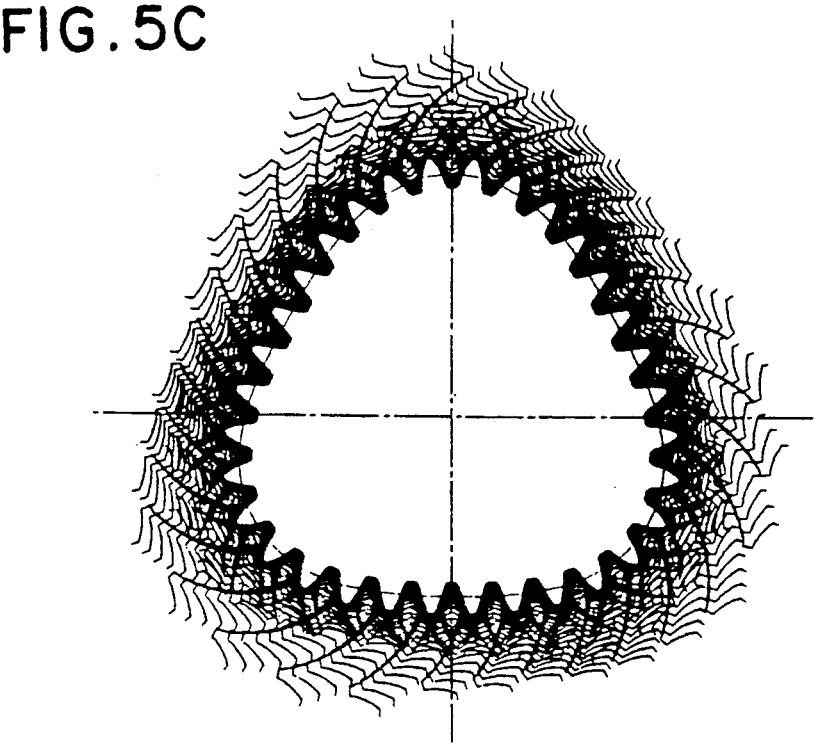
Figure 5D:
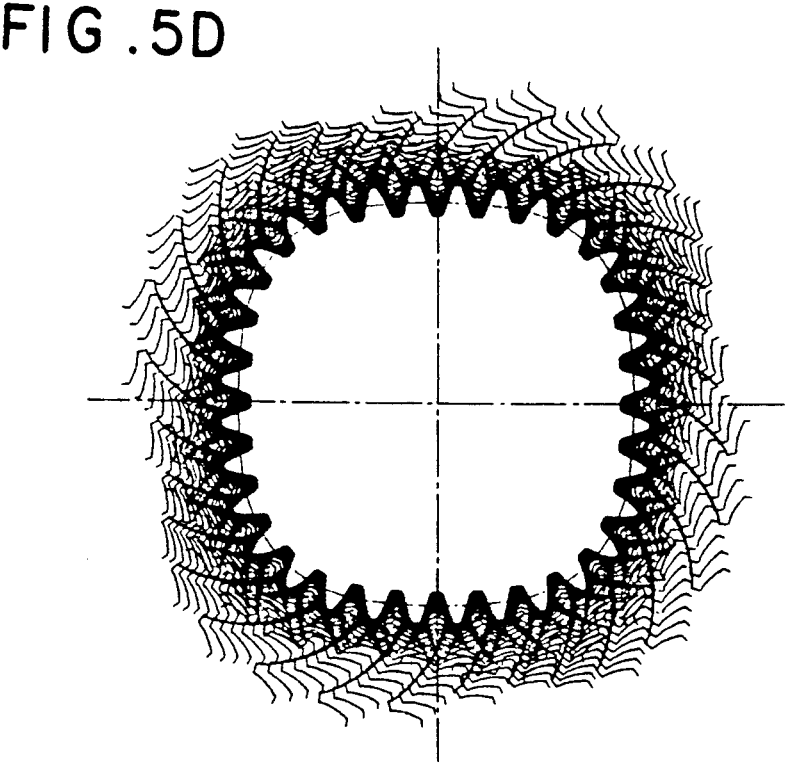

The relations of the angles of rotation of the aforementioned paired gears 1 and 2 are plotted in FIG. 3. On the other hand, the relations between angle of rotation and the gear ratio of the case, in which one gear is a driving gear whereas the other is a driven gear, are plotted in FIGS. 4A and 4B. As could be easily understood from FIGS. 4A and 4B, the gear ratios smoothly vary between the constant velocity portions and the inconstant velocity portions because these portions smoothly merge into each other.

Incidentally, the angles $\theta_1$ and $\theta_2$ are given the predetermined values because the gears of the foregoing case are formed with the constant velocity portions. If, however, $\theta_1 = \theta_2 = 0$, the gears are the ordinary elliptic ones because $l_{n1} = l_{n2}$, $e_{n1} = e_{n2}$, and $n_1 = n_2 = 1$.

In the present invention, on the other hand, the length of $\underline{l}$ may be different for the first gear 1 and the second gear 2. In this invention, moreover, the gear may be formed with a plurality of constant velocity portions and inconstant velocity portions.

According to the elliptic gear of the present invention, as has been described hereinbefore, there can be established a smooth transition from the state, in which the angular velocity ratio is constant, to the state in which the angular velocity ratio continuously changes. As a result, a manual unit can be prevented, if composed of the elliptic gears of the invention, from any discontinuous change in the operating force, so that it has no feeling of incompatible operation. Since, moreover, the change in the angular velocity ratios can be achieved by one pair of gears, the gear unit can be simplified. Still moreover, the gears of the invention can have their pitch circles expressed by the same formulas as those expressing the pitch circles of the existing cylindrical or elliptic gears, respectively, so that they can be easily machined by the well-known machine such as a numerical control (NC) shaper.

What is claimed is:

1. An elliptic gear arrangement comprising:
   a pair of elliptic gears, each gear of said pair of gears having constant and inconstant velocity portions, said constant and inconstant velocity portions having a radius and angle set by the following formulas based upon a center angle $\theta_1$ of the constant velocity portion of a first elliptic gear of said pair of gears, a gear ratio $\xi$ of the constant velocity portions of said pair of gears and a rotational center distance C of said pair of gears:
   center angle $\theta_2$ of the constant velocity portion of a second elliptic gear of said pair of gears: $\theta_2 = \theta_1/\xi$;
   maximum radius $R_{max1}$ of the constant velocity portion of said first elliptic gear of said pair of gears: $R_{max1} = C/(1+\xi)$;
   minimum radius $R_{min2}$ of the constant velocity portion of the second elliptic gear of said pair of gears: $R_{min2} = \xi C/(1+\xi)$;
   maximum one-half $\phi_{maxj}$ of a center angle $\theta_j$ of the inconstant velocity portion of an individual elliptic gear of said pair:

$$\phi_{maxj} = \pi - \theta_j/2,$$

where
   j is 1 for said first elliptic gear, and
   j is 2 for said second elliptic gear;
   radius $R_{j1}$ of the inconstant velocity portion of said first elliptic gear: $R_{j1} = R_{max1} - A$;
   radius $R_{j2}$ of the inconstant velocity portion of said second elliptic gear: $R_{j2} = R_{min2} + A$, where $$A = \frac{\phi_{max1}^2 R_{max1}^2 - \phi_{max2}^2 R_{min2}^2}{2(\phi_{max1}^2 R_{max1} + \phi_{max2}^2 R_{min2})},$$

whereby said first and said second elliptic gears smoothly mesh without abruptly changing an operational speed at a boundary portion of the constant in inconstant velocity portions.

2. An elliptic gear arrangement as claimed in claim 1, wherein pitch curves of the constant velocity portion and the inconstant velocity portion of said first elliptic gear are smoothly merged, and pitch circle curves of the constant velocity portion of said second elliptic gear are smoothly merged.

3. An elliptic gear arrangement as claimed in claim 1, wherein pitch circle radiuses at an end of the constant velocity portion and the inconstant velocity portion of said first elliptic gear are equal to each other and pitch circle radiuses at an end of the constant velocity portion and the inconstant velocity portion of said second elliptic gear are equal to each other.

4. An elliptic gear arrangement as claimed in claim 1, wherein tangent lines of pitch circles at an end of the constant velocity portion and inconstant velocity portion of said first elliptic gear are aligned with each other, and tangent lines of pitch circles at an end of the constant velocity portions and inconstant velocity portion of said second elliptic gear are aligned with each other.

* * * * *

UNITED STATES PATENT AND TRADEMARK OFFICE
CERTIFICATE OF CORRECTION

PATENT NO. : 5,170,677
DATED : December 15, 1992
INVENTOR(S) : YONEKURA, et al.

It is certified that error appears in the above-identified patent and that said Letters Patent is hereby corrected as shown below:

On the Title page, the filing date of the subject patent should read:

[22] Filed: Nov. 14, 1991

Signed and Sealed this

First Day of March, 1994

*Attest:*

BRUCE LEHMAN

*Attesting Officer*     *Commissioner of Patents and Trademarks*